(12) United States Patent
Wang

(10) Patent No.: US 10,810,434 B2
(45) Date of Patent: Oct. 20, 2020

(54) MOVEMENT AND TRANSPARENCY OF COMMENTS RELATIVE TO VIDEO FRAMES

(71) Applicant: Shanghai Bilibili Technology Co., Ltd., Shaghai (CN)

(72) Inventor: Yuxing Wang, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 101 days.

(21) Appl. No.: 16/279,889

(22) Filed: Feb. 19, 2019

(65) Prior Publication Data

US 2019/0266408 A1 Aug. 29, 2019

(30) Foreign Application Priority Data

Feb. 27, 2018 (CN) .......................... 2018 1 0165476

(51) Int. Cl.
*G06K 9/00* (2006.01)
*G06T 7/13* (2017.01)
*G06T 11/00* (2006.01)

(52) U.S. Cl.
CPC ..... *G06K 9/00744* (2013.01); *G06K 9/00248* (2013.01); *G06K 9/00275* (2013.01); *G06K 9/00342* (2013.01); *G06K 9/00369* (2013.01); *G06T 7/13* (2017.01); *G06T 11/00* (2013.01)

(58) Field of Classification Search
CPC ........... G06K 9/00744; G06K 9/00248; G06K 9/00275; G06K 9/00342; G06K 9/00369; G06K 9/3266; G06T 11/00; G06T 7/13

USPC ......................................................... 382/103
See application file for complete search history.

(56) References Cited

U.S. PATENT DOCUMENTS

| | | | | | |
|---|---|---|---|---|---|
| 6,678,413 | B1 * | 1/2004 | Liang | ................. | G06K 9/00335 382/181 |
| 6,829,371 | B1 * | 12/2004 | Nichani | .................. | F16P 3/142 348/252 |
| 2018/0342070 | A1 * | 11/2018 | Chen | .................. | G06K 9/00744 |

FOREIGN PATENT DOCUMENTS

| | | |
|---|---|---|
| CN | 101573733 A | 11/2009 |
| CN | 103729614 A | 4/2014 |
| CN | 104735518 A | 6/2015 |
| CN | 105635848 A | 6/2016 |
| CN | 106303731 A | 1/2017 |
| CN | 107147941 A | 9/2017 |
| CN | 107181976 A | 9/2017 |

\* cited by examiner

*Primary Examiner* — Ayodeji O Ayotunde
(74) *Attorney, Agent, or Firm* — BakerHostetler

(57) ABSTRACT

Techniques for presenting comments relative to video frames are described herein. The disclosed techniques include obtaining a video comprising a plurality of frames; detecting an edge of at least one object in a frame among the plurality of frames; identifying an area inside the edge of the at least one object as a first area and filling the first area with a color so as to distinguish the first area from others; determining a location of the first area relative to the frame; and determining a movement direction of at least one comment to be presented relative to the frame or a change of a transparency value of the at least one comment to be presented relative to the frame based at least on the location of the first area.

20 Claims, 10 Drawing Sheets

MOVEMENT AND TRANSPARENCY OF COMMENTS RELATIVE TO VIDEO FRAMES

CROSS-REFERENCE TO RELATED APPLICATION

The present application claims priority of Chinese patent application No. 201810165476.9, filed on Feb. 27, 2018. The entire disclosure of the above-identified application is hereby incorporated by reference herein and made a part of this specification.

BACKGROUND

Users may attempt to access conventional social media on their devices to communicate about interesting content. Using conventional social media may be cumbersome as users may have to switch back and forth between different applications to access the content of interest and social media related to the content. As communication devices, such as mobile phones, become more sophisticated, people continue to discover new ways to communicate.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

Figure 1:
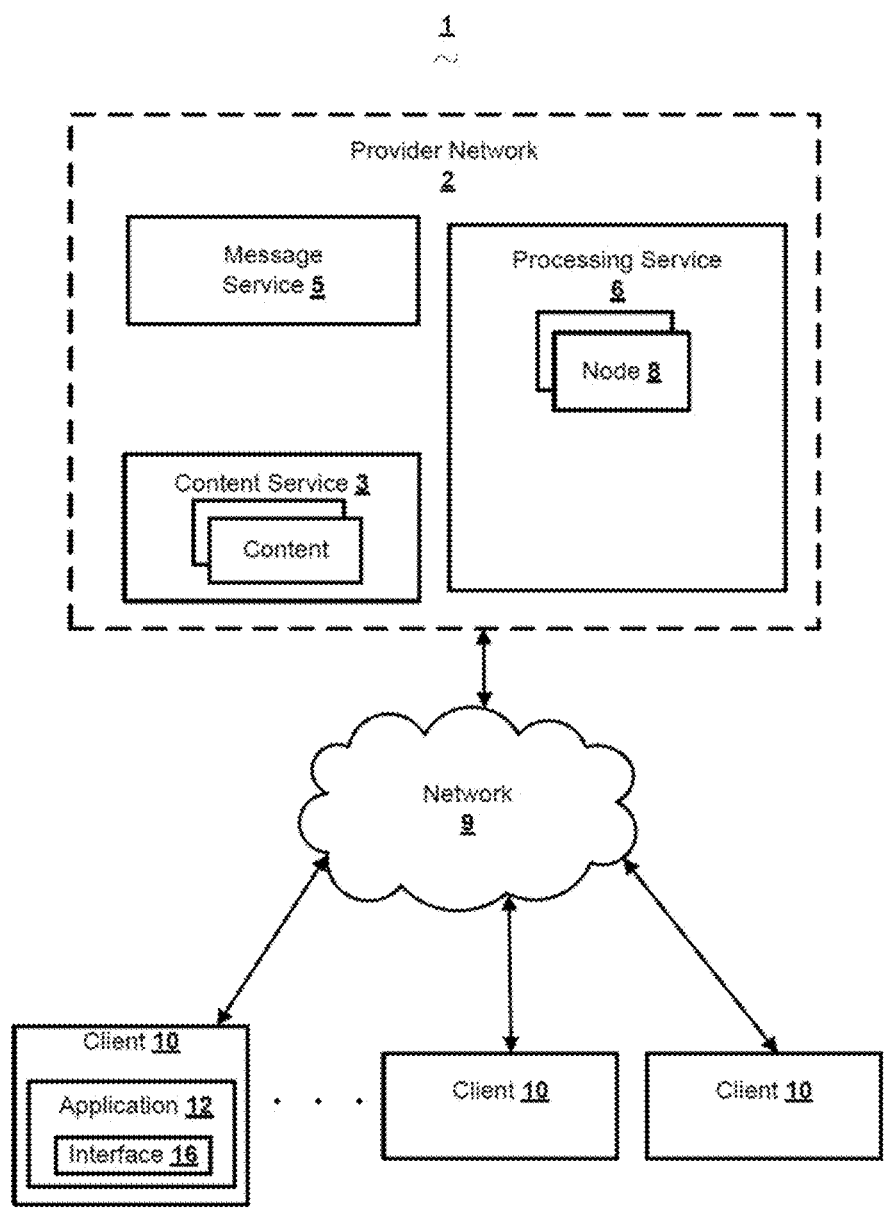
FIG. 1 is a schematic diagram illustrating an example system that may be used in accordance with the present disclosure.

FIG. 1 is a schematic diagram showing an example system 1 that may be used in accordance with the present disclosure. The system 1 may comprise a provider network 2 and a plurality of client devices 10. The provider network 2 and the plurality of client devices 10 may communicate with each other via one or more networks 9.

In some embodiments, the content service 3 may be implemented as part of the provider network 2. In other embodiments, the content service 3 may be managed by a separate service provider than a service provider of the provider network 2. It should also be understood that the provider network 2 may provide additional content services separate from the content service 5.

The content service 3 may comprise a content streaming service, such as an Internet protocol video streaming service. The content streaming service may be configured to distribute content via a variety of transmission techniques. The content service 3 may be configured to provide the content, such as video, audio, textual data, a combination thereof, and/or the like. The content may comprise content streams (e.g., video stream, audio stream, information stream), content files (e.g., video file, audio file, text file), and/or other data. The content may comprise gaming content. For example, the content service 5 may comprise a collaborative gaming platform, a video sharing service, a video hosting platform, a content distribution platform, and/or the like.

The provider network 2 may implement a commentary service configured to allow users to comment and/or share comments associated with content. The comments may be displayed with the content on the same screen. For example, the comments may be displayed in an overlay above the content. The comments may be encoded into a format of the content. For example, the comments may be encoded as video content as the original content. The comments may be animated when displayed. For example, the comments may be shown scrolling (e.g., from right to left, left to right, top to bottom, bottom to top) across the content, which may be referred to as "bullet screens."

The provider network 2 may be located at a data center, such as a single premise, or be distributed throughout different geographic locations (e.g., at several premises). The provider network 2 may provide the services via the one or more networks 9. The networks 9 comprise a variety of network devices, such as routers, switches, multiplexers, hubs, modems, bridges, repeaters, firewalls, proxy devices, and/or the like. The networks 9 may comprise physical links, such as coaxial cable links, twisted pair cable links, fiber optic links, a combination thereof, and/or the like. The networks 9 may comprise wireless links, such as cellular links, satellite links, Wi-Fi links and/or the like.

The provider network 2 may comprise a message service 5. The message service 5 may be configured to receive a plurality of messages. The plurality of messages may comprise a plurality of comments associated with content and information related to the plurality of comments. The plurality of messages may be associated with a particular content item, content session, and/or the like.

The message service 5 may be configured to manage messages for various content items. Users may browse content and access different content items to view comments for particular content, such as comments posted by other users for that particular content. Comments from users associated with a particular content item may be output to other users watching the particular content item. For example, all users accessing a content item (e.g., video clip) may view comments associated with the content item. Comments that are input may be output in real-time or near-real-time.

The message service 5 may be configured to process the plurality of messages. The message service 5 may implement a queue or otherwise prioritize processing of the plurality messages based on information, e.g., time stamps, incremented identifier, associated with corresponding comments. The message service 5 may be configured to process the plurality of messages using load balancing. For example, the message service 5 may be configured to use one or more of the plurality of processing nodes to process the messages, prioritize the messages, load balance the messages, and/or the like. The message service 5 may store, at least temporarily, the plurality of messages. The message service 5 may store the messages in a datastore, such as a database.

The message service 5 may be configured to process a message by performing a grouping process. The grouping process may comprise grouping messages based on a characteristic. If two messages have the same characteristic or are within a threshold range of a characteristic, then the messages may be grouped. Messages associated with a particular content item (e.g., stream, file, show, movie, song, game session) may be associated with the same group. For example, a message may comprise or be associated with a content identifier. The content identifier may uniquely identify the content item. The message service 5 may associate a message with a group associated with the content item if the content identifier is found in the message or otherwise associated with the message (e.g., sent separately).

The message service 5 may perform natural language processing, topic recognition, pattern recognition, artificial intelligence, and/or the like to automatically determine characteristics of the messages and/or group the messages. As an example, frequently occurring phrases or patterns may be identified as topics. As another example, a database of topics associated with content may be maintained. The topics may include genres (e.g., action, drama, comedy), personalities (e.g., actors, actresses, directors), languages, and/or the like. Messages may be grouped based on characteristics of the client device and/or users sending the messages. Demographics, interests, history, and/or like may be stored for a plurality of users to determine potential groupings of messages.

The message service 5 may be configured to process messages by determining contexts for outputting (e.g., displaying, presenting) comments comprised in the messages. The context may comprise a context for outputting a comment based on the grouping. The context may comprise a time context associated with a time to output the comment.

A message may indicate a time when a comment was input by a user. The time may comprise a time internal to the content item or other similar information, such as fragment identifiers. For example, the time may indicate a portion of the content item (e.g., one or more content fragments) that was viewed by a user when the user input a comment. The time may indicate when a user started inputting the comment, a duration of inputting, a time when the input was submitted, and/or the like.

The message service 5 may determine to output a comment during or close to the portion of content item being commented. In an example, if multiple messages are received for a portion of time (e.g., a scene), then a time offset may be added to some of the messages to prevent all of corresponding comments from being output at the same time.

The context may further comprise a graphical context associated with a form of the comment. The graphical context may comprise a size, a color, a font, and/or the like. The context may comprise a moving context in which the comment moves when output. The moving context may comprise an animation. For example, the moving context may comprise a direction of movement (e.g., left to right, right to left, up to down, down to up, diagonally). The moving context may comprise any type of animation, such as a spinning motion, a waving motion, a zig-zag, a circular motion, increasing in size, decreasing in size, and/or the like.

The context may be determined based on a preference associated with a message. For example, a user may specify a preference for how a corresponding comment is to be output. The user may specify the context for a particular comment. The context may be determined based on a characteristic of a particular content item. For example, the graphical context may be determined based on the background color of the content item during a particular segment. The graphical context may contrast with the background color of the content item.

The message service 5 may be further configured to process a message by generating output data. The output data may comprise instructions for implementing outputting a comment based on corresponding context. The output data may comprise application data for instructing an application to overlay the comment based on the context. The output data may comprise instructions for generating (e.g., encoding) content corresponding to a comment.

The output data may be used to generate (e.g., encode) output commentary content, such as an output content stream. The output commentary content may be combined (e.g., multiplexed) with original content item such as the content provided by the content service 3. The resulting combination may comprise content in a single package (e.g., container, transport container, transport stream). The package may comprise the original content item along with the output commentary content (e.g., displayed on top of the original content item).

The message service 5 may be further configured to process messages by performing a screening process. The screening process may comprise rejecting or flagging messages that match screening criteria. The screening criteria may specify terms and/or phrases, such as profanity, hate speech, indecent language, and/or the like. The screening criteria may specify characters, such as symbols, fonts, and/or the like. The screening criteria may specify languages, computer readable code patterns, and/or the like.

The provider network 2 may further comprise a processing service 6. The processing service 6 may be configured to provide processing for a variety of services, such as the services of the provider network 2. The processing service 6 may comprise a plurality of processing nodes 8 (e.g., as a service). The plurality of processing nodes 8 may process tasks associated with a message service 5. The plurality of processing nodes 8 may be implemented as one or more computing devices, one or more processors, one or more virtual computing instances, a combination thereof, and/or the like.

The plurality of processing nodes 8 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

The plurality of processing nodes 8 may comprise nodes associated with providing specific services (e.g., processing tasks). The nodes may be dedicated to providing these specific services. For example, the plurality of processing nodes 8 may implement a receiver, a content generator, a combiner, a transcoder, a combination thereof.

In some embodiments, the plurality of processing nodes 8 may process events submitted by the plurality of client computing devices. The events may be associated with discussing real-time news, videos, social hot topics, reports against certain user accounts, and/or the like. In other embodiments, the plurality of processing nodes 8 may process performance evaluation for a plurality of user account who review events in the network community. In some implementations, these services may be implemented as dedicated computing devices, dedicated processors, dedicated virtual machine instances, and/or the like. In other implementations, a variety of different nodes may implement any of the functions associated with these services.

The plurality of client devices 10 may be configured to access the content and the services of the provider network 2. The plurality of client devices 10 may comprise any type of computing device, such as a mobile device, a tablet device, laptop, a computing station, a smart device (e.g., smart apparel, smart watch, smart speaker, smart glasses), a virtual reality headset, a gaming device, a set top box, digital streaming device, robot, a vehicle terminal, a smart TV, a TV box, an e-book reader, MP3 (Moving Picture Experts Group Audio Layer III) players, MP4 (Moving Picture Experts Group Audio Layer IV) players, and so on.

The plurality of client devices 10 may be associated with one or more users. A single user may use one or more of the plurality of client devices 10 to access the provider network 2. The plurality of client devices 10 may travel to a variety of locations and use different networks to access the provider network 2.

An example client device 10 may comprise an application 12. The application 12 outputs (e.g., display, render, present) content to a user. The content may comprise videos, audio, comments, textual data and/or the like. The application 12 may also provide a menu for navigating a variety of content.

The client device 10 may access an interface 16 that allows users to provide comments associated with corresponding content and submit events to a processing service. The interface 16 may comprise an input element. For example, the input element may be configured to receive input from a user, such as comments associated with a particular content, events, user accounts, and/or the like. In some embodiments, the interface 16 may be implemented as part of the application 12.

The application 12 may allow a user to set a context (e.g., color, font size, animation, emoji, scrolling direction) associated with his or her input. The application 132 may determine (e.g., automatically) other context information, such as timing information (e.g., start time, duration, end time for the input). The application 12 may send the input, the context, the context information, and/or other information to the message service 5 of the provider network 2.

The application 12 may also send events to a processing service. As an example, the application 12 may send reports against certain users to a processing service, and the application 12 may also send reviews about the reports to the processing service. The events or reviews sent from the plurality of client computing devices comprise reasons of submitting the events, content attributes associated with the events, user account information, and/or the like. The techniques for processing events and evaluating performance of a plurality of user accounts in accordance with the present disclosure can be implemented by the example system as shown in FIG. 1.

Figure 2:
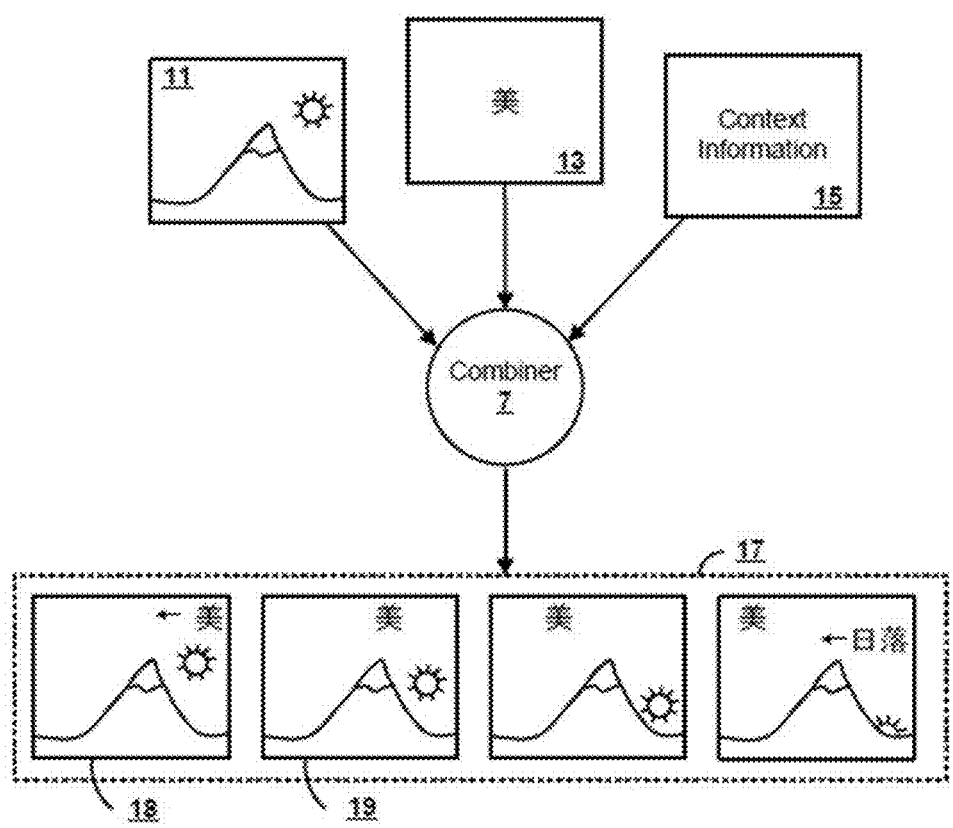
FIG. 2 is a schematic diagram illustrating an example process for combining content that may be used in accordance with the present disclosure.

FIG. 2 is a schematic diagram showing an example process for combining content. A combiner 7 may be configured to receive content 11. As illustrated in this example, the content 11 may comprise a video. It should be understood that other content may be used. The content 11 may comprise a plurality of frames, such as a series of images. The plurality of frames may be time ordered. For example, a first frame maybe ordered before a second frame.

The combiner 7 may be implemented by any of the services and/or devices described herein. For example, the combiner 7 may be implemented by the processing service 6 or the message service 5 of the provider network 2. In other examples, the combiner 7 may be implemented by the application 12 of the client devices 10.

The combiner 7 may be configured to receive message data 13 associated with the content 11. The message data 13 may comprise one or more characters. As illustrated in this example, shown in FIG. 2, a Chinese character is shown. It should be understood, that the message data 13 may comprise multiple characters, symbols, and/or like in one or more languages. For example, the message data 13 may comprise comments from users associated with the content 11.

The combiner 7 may be further configured to receive context information 15. The context information 15 may indicate a context for rendering the message data 13 associated with the content 11. The context information 15 may comprise timing information indicating a time to render the message data 13 with the content 11. The context information 15 may comprise a start time associated with the message data, a scrolling speed, a font size, a font color, an end time associated with the message data, and/or other relevant information.

The combiner 7 may be configured to combine the content 11 and the message data 13 to generate combined content 17 based on the context information 15. The combiner 7 may combine the content 11 and the message data 13 by generating a content package. The content package may comprise a container, such as a transport container (e.g., MPEG transport or other transport container), a formatted container (e.g., as specified for an encoding format). The content package may comprise instructions for a rendering engine to render the content 11 and the message data 13 at least partially together.

As shown in FIG. 2, the combiner 7 may combine the content 11 and the message data 13 by generating a modified video. For example, at least a portion of the message data may be added to the plurality of frames. The message data may be animated separately from the video and/or may be combined with (e.g., overlain, inserted into, added to, associated with, encoded into) frames of the video.

Using the content information, positions (e.g., relative to the plurality of frames) for the message data (e.g., characters) may be determined for one or more (or each) of the plurality of frames. A first position may be determined for a first frame 18. A second position may be determined for the second frame 19. The second position may be different than the first position. The second position may be determined based on the first position.

For example, a path for rendering characters of the message data may be determined. The path may specify a direction for animating and/or scrolling text above the content 11. The direction may vary. For example, the path may be curvilinear. The second position may be further along the path than the first position (e.g., if the second frame is after the first frame in the time ordering). If the path is from right to left, as shown in FIG. 2, then the second position may be further left than the first position. The combiner 7 may combine the content 11 and the message data 13 in a manner that the message data 13 is successively rendered along the path as the plurality of frames of the content progress.

Though only one character is shown, the combiner 7 may be configured to receive message data from a variety of sources at any time and combine the message data 13 with the content 11. For example, message data 13 from a plurality of users may be received and combined with the content 11. Different message data 13 may be combined in a manner that the message data 13 is rendered at least partially simultaneously.

For example, several messages from different users (e.g., another user may comment "日 落" or sunset) may be rendered at least partially at the same time with the content 11. The message data may be combined in a manner that allows for the content 11 to remain viewable during rendering of the message data. For example, the message data may be combined with the content 11 using constraints that limit the number of messages shown simultaneously, limit the location of message data (e.g., shown in areas where pixels have less change, shown in background areas of the content), and/or the like as described further herein. As an example, the message data may be shown in a background, such as the sky behind a mountain in the example of FIG. 2. In other embodiments, the message data are not received as a series of messages, but rather the messages are combined and rendered by a separate service. In such an embodiment, the messages are not separately identifiable by the combiner 7 but rather are received as, e.g., a video overlay.

Figure 3:
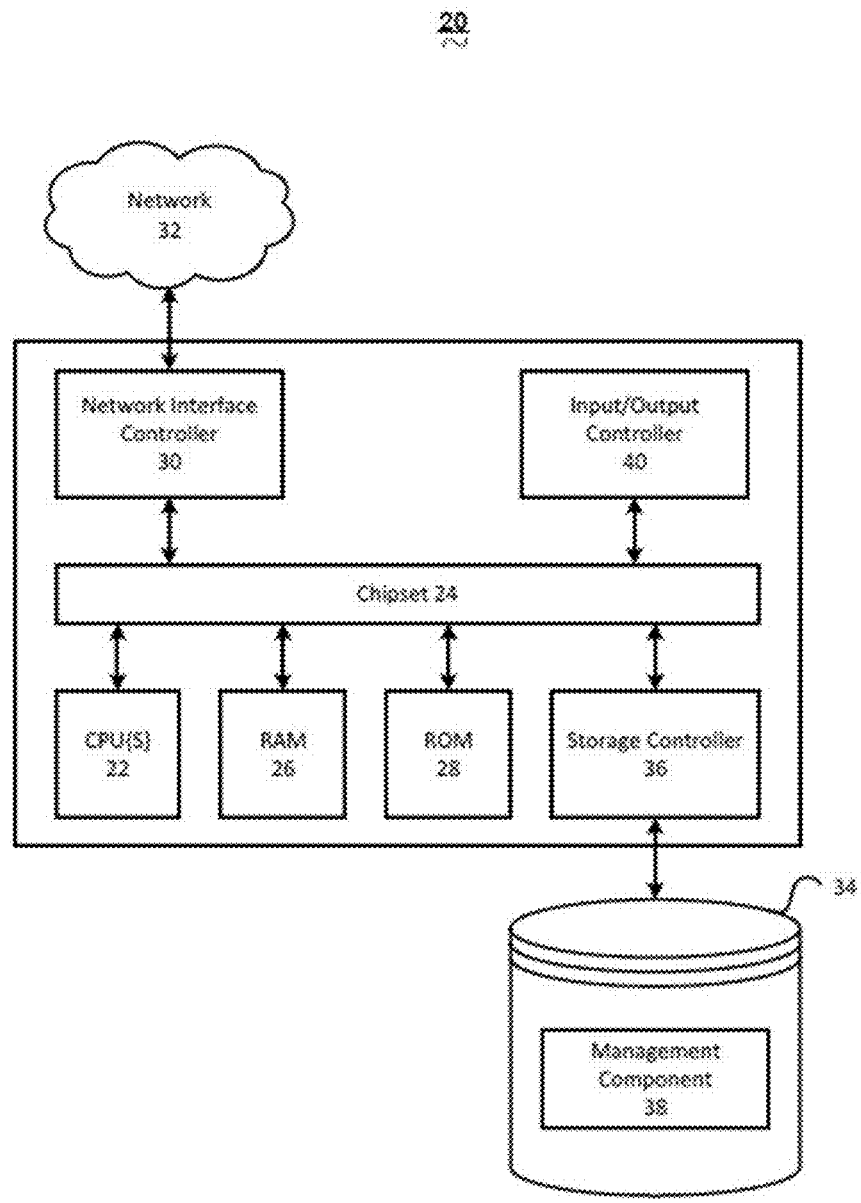
FIG. 3 is a schematic diagram illustrating an example computing device that may be used in accordance with the present disclosure.

FIG. 3 depicts a computing device that may be used in various aspects, such as the services, networks, and/or clients depicted in FIG. 1. With regard to the example architecture of FIG. 1, the message service, content service, processing service, provider network, and client may each be implemented by one or more an instances of a computing device 20 of FIG. 3. The computer architecture shown in FIG. 3 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 20 may include a baseboard, or "motherboard," which is a printed circuit board to which a multitude of components or devices may be connected by way of a system bus or other electrical communication paths. One or more central processing units (CPUs) 22 may operate in conjunction with a chipset 24. The CPU(s) 22 may be standard programmable processors that perform arithmetic and logical operations necessary for the operation of the computing device 20.

The CPU(s) 22 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 22 may be augmented with or replaced by other processing units, such as GPU(s). The GPU(s) may comprise processing units specialized for but not necessarily limited to highly parallel computations, such as graphics and other visualization-related processing.

A chipset 24 may provide an interface between the CPU(s) 22 and the remainder of the components and devices on the baseboard. The chipset 24 may provide an interface to a random access memory (RAM) 26 used as the main memory in the computing device 20. The chipset 24 may further provide an interface to a computer-readable storage medium, such as a read-only memory (ROM) 28 or non-volatile RAM (NVRAM) (not shown), for storing basic routines that may help to start up the computing device 20 and to transfer information between the various components and devices. ROM 28 or NVRAM may also store other software components necessary for the operation of the computing device 20 in accordance with the aspects described herein.

The computing device 20 may operate in a networked environment using logical connections to remote computing nodes and computer systems through local area network (LAN). The chipset 24 may include functionality for providing network connectivity through a network interface controller (NIC) 30, such as a gigabit Ethernet adapter. A NIC 30 may be capable of connecting the computing device 20 to other computing nodes over a network 32. It should be appreciated that multiple NICs 30 may be present in the computing device 20, connecting the computing device to other types of networks and remote computer systems.

The computing device 20 may be connected to a mass storage device 34 that provides non-volatile storage for the computer. The mass storage device 34 may store system programs, application programs, other program modules, and data, which have been described in greater detail herein. The mass storage device 34 may be connected to the computing device 20 through a storage controller 36 connected to the chipset 24. The mass storage device 34 may consist of one or more physical storage units. The mass storage device 34 may comprise a management component 38. A storage controller 36 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 20 may store data on the mass storage device 34 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 34 is characterized as primary or secondary storage and the like.

For example, the computing device 20 may store information to the mass storage device 34 by issuing instructions through a storage controller 36 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 20 may further read information from the mass storage device 34 by detecting the physical states or characteristics of one or more particular locations within the physical storage units.

In addition to the mass storage device 34 described above, the computing device 20 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 20.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 34 depicted in FIG. 3, may store an operating system utilized to control the operation of the computing device 20. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 34 may store other system or application programs and data utilized by the computing device 20.

The mass storage device 34 or other computer-readable storage media may also be encoded with computer-executable instructions, which, when loaded into the computing device 20, transforms the computing device from a general-purpose computing system into a special-purpose computer capable of implementing the aspects described herein. These computer-executable instructions transform the computing device 20 by specifying how the CPU(s) 22 transition between states, as described above. The computing device 20 may have access to computer-readable storage media storing computer-executable instructions, which, when executed by the computing device 20, may perform the methods described herein.

A computing device, such as the computing device 20 depicted in FIG. 3, may also include an input/output controller 40 for receiving and processing input from a number of input devices, such as a keyboard, a mouse, a touchpad, a touch screen, an electronic stylus, or other type of input device. Similarly, an input/output controller 40 may provide output to a display, such as a computer monitor, a flat-panel display, a digital projector, a printer, a plotter, or other type of output device. It will be appreciated that the computing device 20 may not include all of the components shown in FIG. 3, may include other components that are not explicitly shown in FIG. 3, or may utilize an architecture completely different than that shown in FIG. 3.

As described herein, a computing device may be a physical computing device, such as the computing device 20 of FIG. 3. A computing node may also include a virtual machine host process and one or more virtual machine instances. Computer-executable instructions may be executed by the physical hardware of a computing device indirectly through interpretation and/or execution of instructions stored and executed in the context of a virtual machine.

Figure 4:
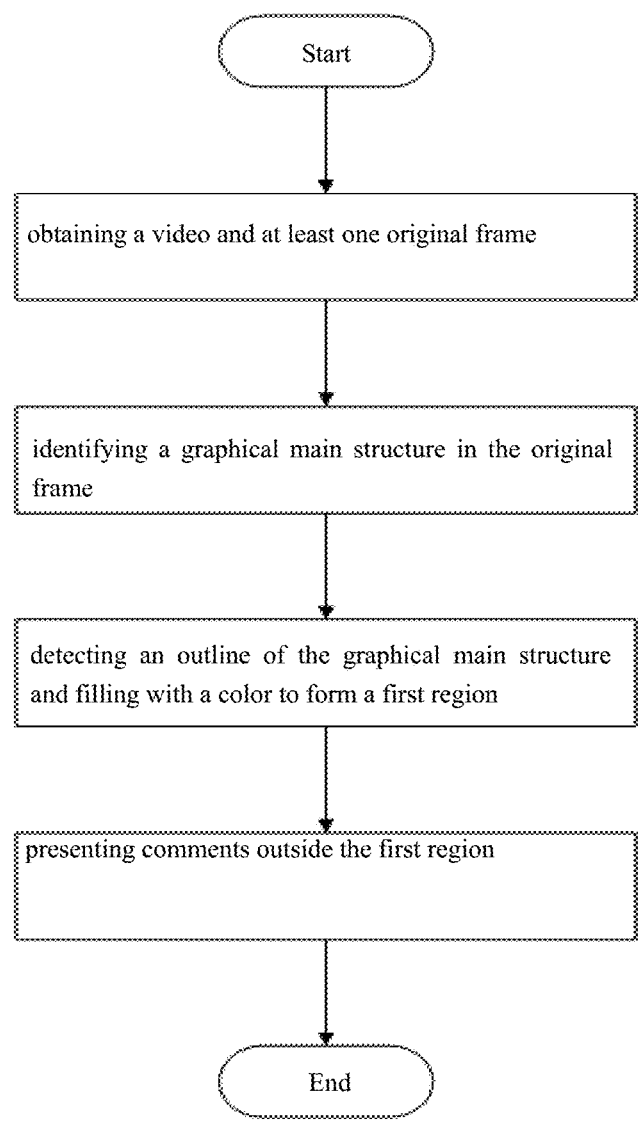
FIG. 4 is a flowchart illustrating an example process of presenting comments relative to a video frame.

Please refer to FIG. 4, which is a flow chart of the method of playing a video with bullet screens of a preferred embodiment of the present invention. In the present embodiment, processing and displaying the video is performed in the following way:

Obtaining a video and dividing the video into at least one original frame: A video that needs to be processed is obtained, or a video source file is obtained randomly, the video is divided into several original frames according to a preset period, for example, 1 second picture in the video is divided into 25 original frames according to 25 frames per second. After the divided original frames are played continuously, the original video can be restored.

Identifying a graphical main structure in the original frame: After the original frame is obtained, usually in the picture shown by the original frame of the video, for a user, the position of an object in the video frame is the picture that the user usually needs to see, therefore, the position of the object is also regarded as the main playing area of the video frame and is expected to be inappropriate to be blocked by comments (i.e., bullet screens). Therefore, in order to avoid the comments from entering into such a main video playing area during the display of the comments, it is necessary to identify the position of the object in the original frame and the size of the area covered by the object in the original frame. It can be understood that, if the original frame is a close-up shot of one certain character, there will be a smaller area for the display of the comments, and if the original frame is a long shot of one certain character, the vast space outside the character can be used as the area of displaying the comments. In an example, the object in the video frame is a human being. In order to confirm the size of the area covered by the character in the original frame, in this embodiment, it is determined by recognizing the limb structure of the character. Specifically, since the outline of the human body is mainly determined by the head and the limbs, the recognition of the limb structure can be the recognitions of the head position of the character, the sizes and the directions extended by the limbs. It can be understood that, the clothes and the like worn by the character can also be recognized in the limb structure to preserve the complete display of the character.

Naturally, besides the character, considering the complexity and the diversity of the video content, in some videos such as scenery introduction, animal introduction and so on, if there is no character feature, the part which is more noticed and concerned by the video viewer in each picture of the video can be regarded as the graphical main structure of the original frame, and it is not limited to the character. Even in some original frames that already have characters, other concerned parts except the characters can also be regarded as the graphical main structure, such as, the architectures in the scenery introduction videos, the outlines of the animals in animal introduction videos, etc.

Detecting an outline of the graphical main structure and filling with a color to form a first region: Taking the limb structure of the human being as an example, after the limb structure of the character in the original frame is determined, the outline of the character limb structure can be closed by the stroke method, and the area in the outline can be understood to belong to the part of the human being, and should not be regarded as the area where the comments are displayed, then, the outline is filled to form the first region. Optionally, before filling, the main hue outside the character limb structure is recognized, and the color filled in the area in the outline is obviously different from the main hue in color temperature and hue, so as to distinguish conveniently the part belonging to the first region from the part belonging to the outside of the first region.

Figure 10:
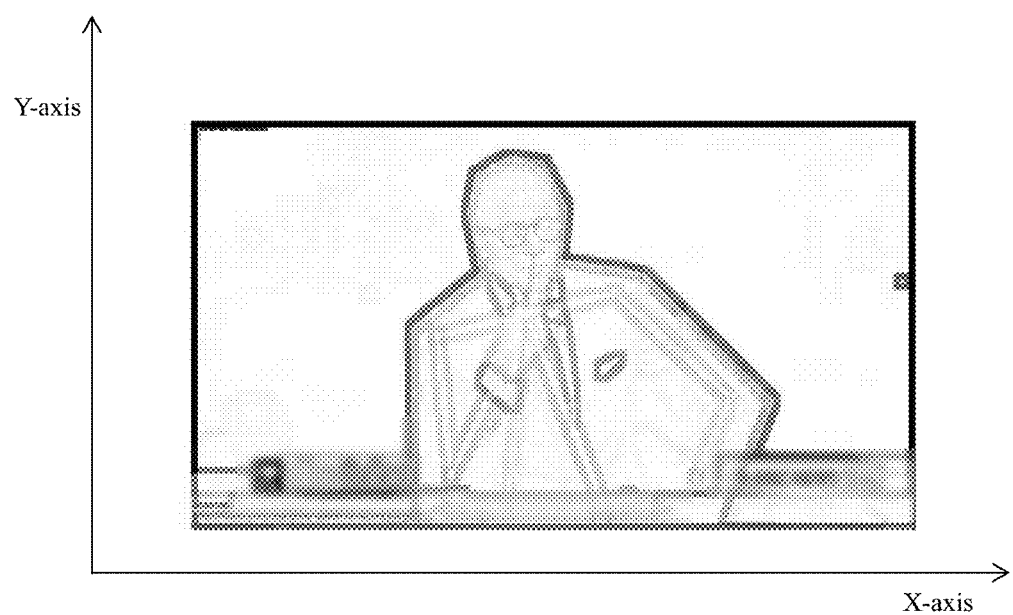
FIG. 10 is a schematic diagram illustrating an exemplary graphical main structure identified in a video frame. the first region

Displaying the comments in the comment displaying area outside the first region in the image of the original frame: Please refer to FIG. 10, after the first region is formed, the first region is recognized as the main body displaying part of the original frame of the current video, because this part should not be blocked by the comments, the comments are displayed only in the playing area outside the first region in the original frame. That is to say, the part in the first region (including the boundary) is the part where the main body of the video is played and displayed, while the part outside the first region is the part where the comments are played and displayed.

With the above configuration, the areas of presenting the comments are controlled by recognizing and dividing each frame of the video, so as to ensure that the main body displaying parts of the video are not blocked.

In a preferred embodiment, the step of identifying a graphical main graphical main structure in the original frame includes: recognizing the boundary pixels of any object in the original frame; extracting an image unit located in the boundary pixels as the graphical main structure. That is to say, what the audience is concerned about can be recognized and highlighted as the graphical main structure of a video frame.

For any picture content formed as the graphical main structure, whether it is a human being, a still object, an animal, a scenery, an architecture, or an artwork, etc., to such a graphical main structure that is concerned by the audiences and needs to be highlighted and recognized, the original frame can be divided and classified by recognizing its boundary pixels. Specifically, there is usually a distinct dividing line between this kind of picture content as a graphical main structure and the picture content outside the graphical main structure. The formation of the dividing line that belongs to the graphical main structure is distinguished by the different properties of the pixels at both sides of the dividing line, the boundary pixels on the boundary can be analyzed after the resolutions, the color temperatures, the hues and so on of all pixels are recognized, then the graphical main structure is extracted by dividing the image units in the boundary pixels.

Figure 5:
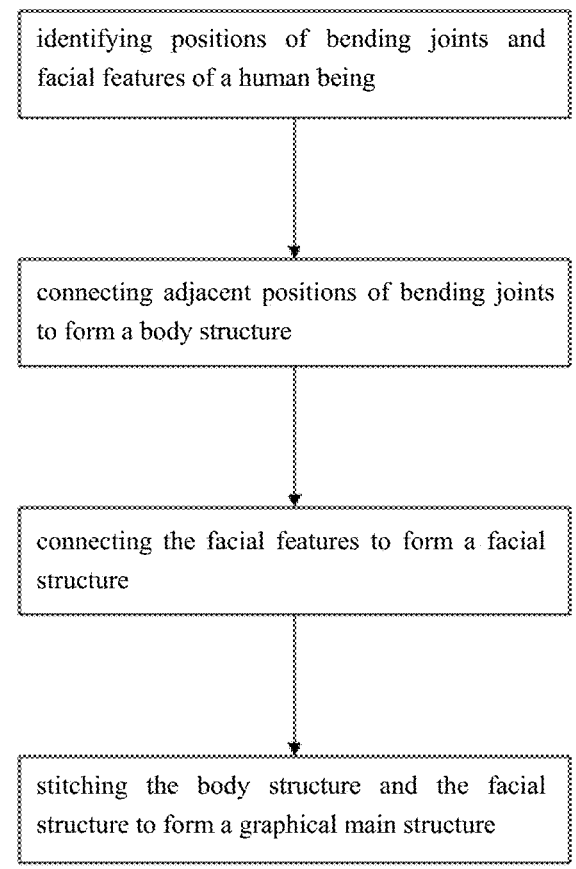
FIG. 5 is a flowchart illustrating an example process of identifying a graphical structure of a human being in a video frame.

As shown in FIG. 5, identifying a human main structure in the original frame can be achieved by the following steps:

Firstly, the joint bending positions and the facial features of a human being are recognized, the joint bending position is the inflection point outside the outline, and also the farthest place where the outline extends in a certain direction, therefore, the recognition of the joint bending positions can determine the maximum range extended by the outline. And as to the recognition of the facial features, considering that the face size of the character is usually smaller than that of the body part, if the width of the body part is used directly, a part of the region that could be used as the area for displaying comments will be wasted. Therefore, the joint bending positions and the facial features of the character will be recognized simultaneously.

Secondly, several joint bending positions are connected to form a body structure. When the joint bending positions are connected, the adjacent joint bending positions can be connected, or the outermost joint bending positions can be connected, to form an irregular polygon body structure.

Thirdly, the facial features are connected to form a facial structure, wherein the facial structure formed is usually round or elliptical. Therefore, after the facial features are determined, the approximate circle or ellipse formed by connecting the farthest points on each facial feature is regarded as the facial structure.

Finally, the body structure and the facial structure obtained are stitched to form the limb structure. Usually, the body structure is connected with the facial structure partially, and they will not be separated in the original frame of the video, therefore, the areas covered by the body structure and the facial structure can be directly added.

Figure 6:
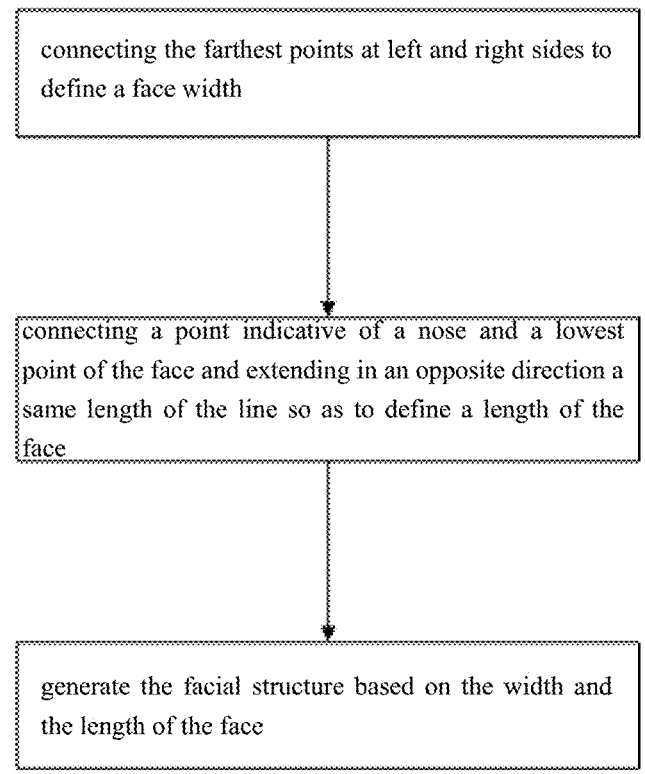
FIG. 6 is a flowchart of illustrating an example process of identifying a facial structure in a video frame.

Please refer to FIG. 6, in a preferred embodiment, in order to reduce the system load of recognizing the facial features and constructing the facial structure, the recognition of the facial features is only to recognize the farthest points at left and right sides, a point indicative of the nose and the lowest point at the lower side of the face of the human being. The distance between the farthest points at left and right sides indicates the width of the face of the character, the point indicative of the nose is regarded as the center of the face of the character and determines the position of the face. In the composition of a video picture, the distance between the lowest point at the lower side and the nose is usually half of the length of the face, therefore, the length of the face is determined by the cooperation of the lowest point at the lower side and the nose. After the main features mentioned above are recognized, the specific steps of forming the facial structure include: connecting the farthest points at left and right sides to obtain a face width; connecting the point indicative of the nose and the lowest point at the lower side to obtain half of the length of the face, and making the line connecting the nose and the lowest point of the lower side extend in reverse about the same length, as the length of the whole face. Finally, on the basis of the face width and the face length, the face width and the face length are spliced to form the facial structure.

Figure 7:
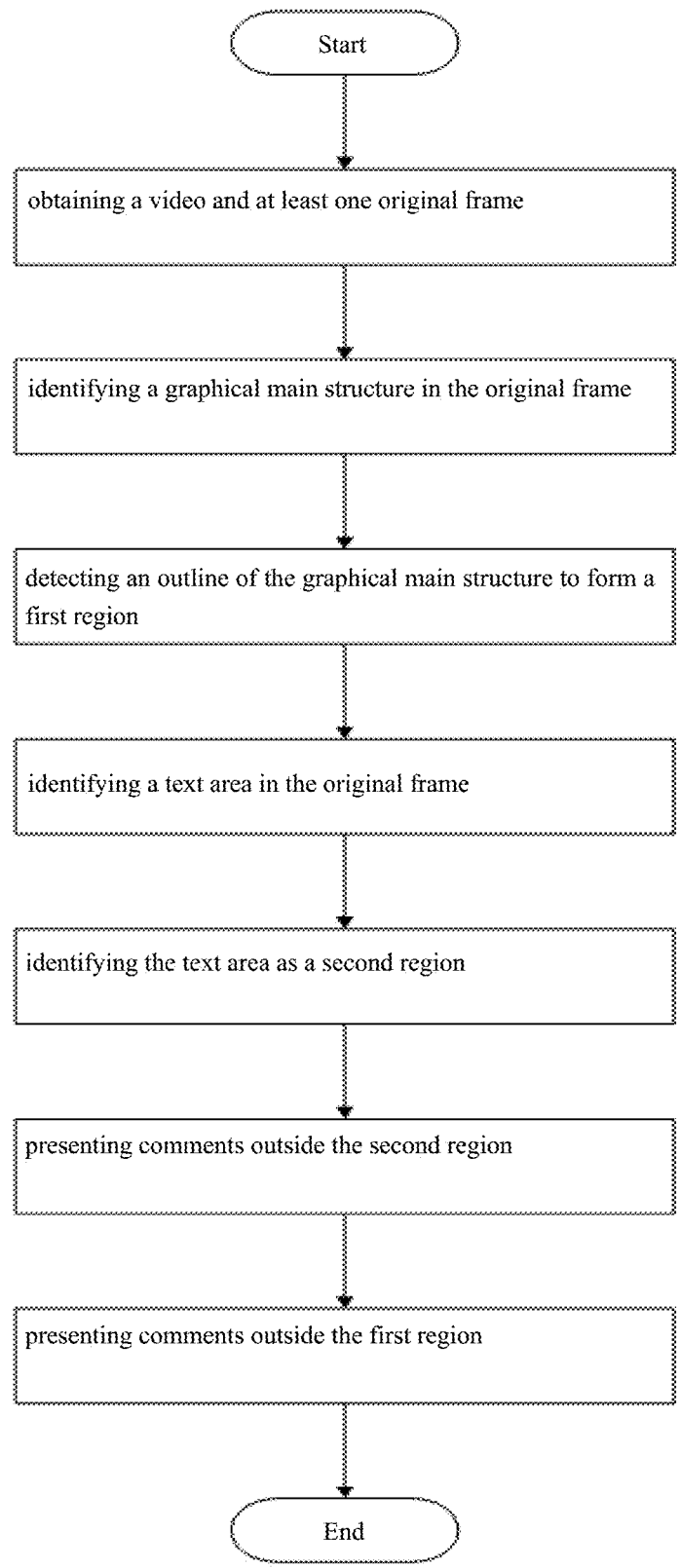
FIG. 7 is a flowchart illustrating another example process of presenting comments relative to a video frame.

Please refer to FIG. 7, after the step of identifying and filling the outline of the graphical main structure to form a first region, the method further includes:

Identifying a text area in the original frame: In the original frame of the video, besides the video main displaying area where the character is located, it may also include text areas such as subtitles, notes and so on. To these text areas, it is also necessary to keep them from being blocked by the comments. Therefore, the text area in the original frame can be recognized by means of opencv.

Identifying and filling the text area to form a second region: Then, the outline of the text area is also identified and filled to form the second separated region which is not allowed to be blocked or displayed by the comments. When the second separated region is formed, in order to also reduce the system load, the text area is formed by framing its outside with a rectangular frame. In some embodiments, a location of the second region is represented by coordinates of four corners of the rectangular box surrounding the tex. It can be understood that, the size of the rectangular box can fit around the text, or slightly larger than the length and the width of the text part, ensuring that the text part is located in the rectangular box.

Displaying the comments in the comment playing area outside the second region in the image of the original frame. After the first region and the second region are identified, the comments will be displayed in the comment playing area outside the first region and the second region.

Figure 8:
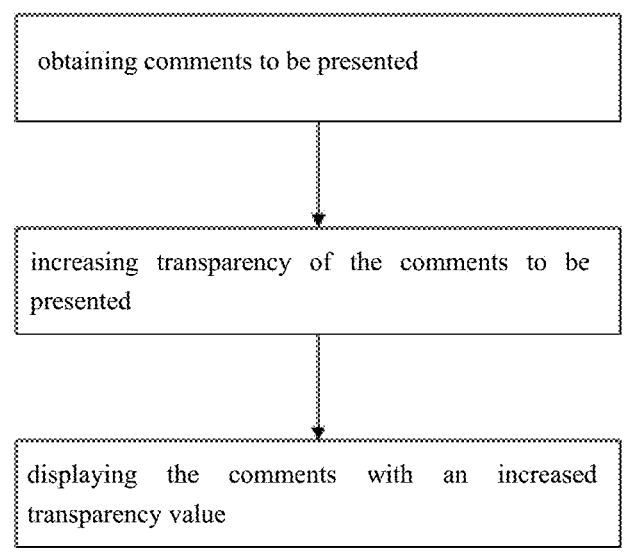
FIG. 8 is a flowchart illustrating an embodiment in accordance with the present disclosure.
Figure 9:
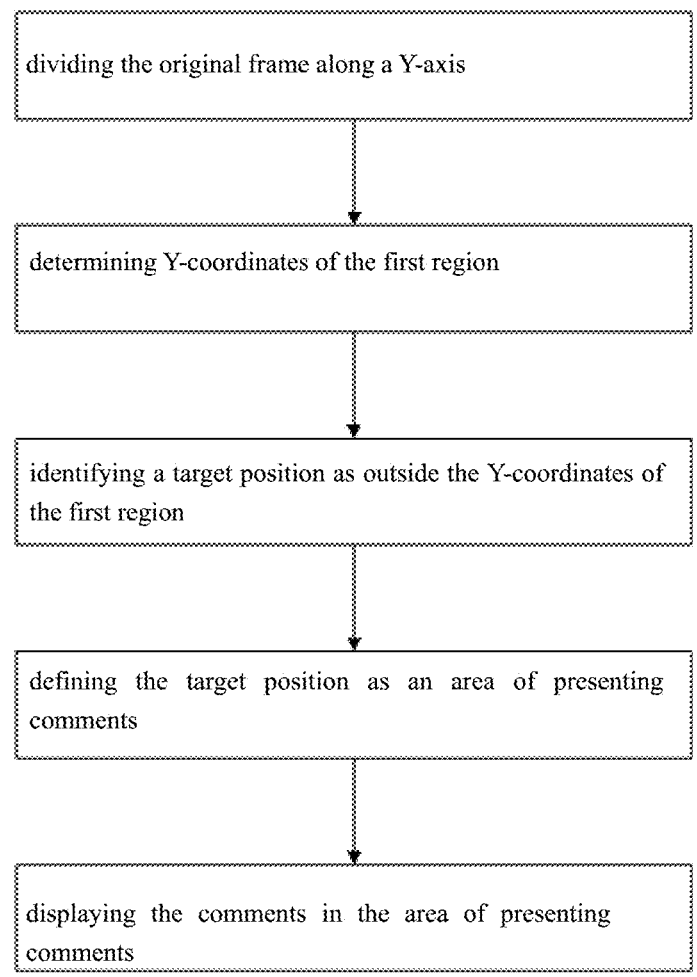
FIG. 9 is a flowchart illustrating another embodiment in accordance with the present disclosure.

Please refer to FIG. 8 and FIG. 9, when the comments are displayed, they can be controlled to be presented only outside the first region and/or the second region by the two following ways.

Embodiment 1

When a video is clicked on a video browsing website to get the video for browsing, the first step is to obtain all comments in the comment pool of the video. Then, when the video is played, according to the content shown by each picture, the main video displaying areas in a video frame, such as the first region, where the comments should not be displayed, are determined according to the above-mentioned parts. In this embodiment, in order to save the system load, the area of displaying the comment is not changed, but the transparency of the comments that will pass through the first region in the displaying process is increased to form comments to be presented. It can be understood that, the process of increasing the transparency of the comments can continue in the displaying process or be adjusted according to the appearance of the first region. For example, if the first region is in the middle of the video frame, when the comments that will pass through the first region in the horizontal direction or in the displaying direction are displayed, if they just appear on the video frame and have not been displayed in the first region, the transparency of the comments remains unchanged, that is, the comments to be played are displayed with a normal transparency value. As the comments slide and move into the first region, the transparency of the comments is increased such as 80%, 90%, etc., to prevent the comments from blocking the video main content in the video frame. When the comments continue to slide away from the first region, they return to be displayed with a normal transparency value. That is to say, the transparency value of the comments is adjusted based on the location of the first region. Of course, it is more convenient to directly adjust the transparency of the comments that will pass through the first region in the horizontal direction or in the displaying direction to be increased for displaying (i.e., the comments will remain an increased transparency value), but the user experience is not as good as the previous adjusting method.

In addition, the increment of the transparency of the comments can be changed according to the change of graphical objects. For example, if the hues of some graphical objects are higher, the transparency of the comments can be increased less. On the contrary, the increment of the transparency value of the comments needs to be increased more. Therefore, when the transparency of the comments is increased, the hue of the graphical object located in the first region is obtained firstly, and then the target transparency to which the comments need to be increased is calculated based on the hue of the graphical object and according to a preset ratio threshold value, such as 50% of the hue, 80% of the hue, or the like, to form the comments to be presented.

Embodiment 2

In another embodiment, it is achieved by controlling directly the sliding direction or the movement direction of the comments so that the comment will not pass through the first region. It is determined based on the location of the first region. For example, the location of the first region in the original frame is obtained firstly, and then the location of the first region is inverted to obtain the position of the area of presenting comments, that is to say, it is needed to obtain the complementary set of the first region in the original frame as the area of present comments. Specifically, the original frame is divided along the Y-axis, and when it is divided, it can be divided based on the height of the comment as a unit of the Y-axis. The Y-axis location of the first region is identified, for example, the original frame is divided to the 0~30 units along the Y-axis direction according to the height of the comment. The Y-axis location of the first region can be 10~20, that is, the comment should not be presented in a Y-coordinate range of 10~20 that is the Y-axis location of the first region. After that, the target positions are identified outside the Y-axis location of the first region, that is, the target positions include areas having Y-coordinates of 0~10 and 20~30. These target positions are regarded as the sliding Y axis that is determined as the area of presenting the comments. When the area of presenting comments is determined, the comments are controlled to be presented only in the comment playing area.

The control mode of Embodiment 2 can be used with the control mode of Embodiment 1 at the same time, i.e. even the transparency of the comments outside the first region can also be controlled to be increased, so as to further highlight the video main body displaying content in a video frame.

In addition, in Embodiment 2, after the Y-axis position of the first region is identified, the comment displaying area is controlled in another way. Similar to Embodiment 1, the control is made only when the first region appears, if the comments just appear on the video and have not entered into the first region, they can slide or be displayed on the Y-axis position of the first region, when the comments come to the location of the first region, they will be changed to be presented at the target positions. When they are changed, they can be changed instantaneously, or can be moved by sliding along the outline of the first region. Through this control way, novel user experience will be provided to users.

When the above-mentioned video playing method is implemented by a server and a user terminal, the video playing method includes the following steps: the server obtaining a video and dividing the video into at least one original frame; the server recognizing a graphical main structure in the original frame; the server identifying an outline of the graphical main structure and filling with a first color to form a first separated region; the user terminal displaying the comments in the comment displaying area outside the first region in the image of the original frame.

Preferably, in the video playing method, the step of the server recognizing a graphical main structure in the original frame includes: the server recognizing the boundary pixels of any one of human being, still object and animal in the original frame; the server extracting an image unit located in the boundary pixels as the graphical main structure.

Preferably, in the video playing method, the step of the server recognizing the boundary pixels of the character in the original frame and extracting an image unit located in the boundary pixels as the graphical main structure includes: the server recognizing the joint bending positions and the facial features of the character; the server connecting the adjacent joint bending positions to form a body structure; the server connecting the facial features to form a facial structure; the server splicing the body structure and the facial structure to form a limb structure.

Preferably, in the video playing method, the step of the server recognizing the facial features includes: the server recognizing the farthest points at both sides, the nose and the lowest point at the lower side of the face of the character; the step of the server connecting the facial features to form a facial structure includes: the server connecting the farthest points at both sides to form a face width; the server connecting the nose and the lowest point at the lower side, to make the line connecting the nose and the lowest point of the lower side and the reverse line with the same length as the line as a face length; the server splicing the face width and the face length to form the facial structure.

Preferably, in the video playing method, after the step of the server identifying the outline of the graphical main structure and filling with a first color to form a first separated region, the method further includes: the server recognizing a text area in the original frame; the server identifying the outline of the text area to form a second separated region; the server displaying the comments in the comment playing area outside the second separated region in the image of the original frame.

Preferably, in the video playing method, the step of the server identifying and filling the outline of the text area to form a second separated region includes: the server framing the outside of the text area with a rectangular box, the rectangular box representing the location of the second separated region.

Preferably, in the video playing method, the step of the server displaying the comments in the comment playing area outside the first region in the image of the original frame includes: the server obtaining the comments; the server increasing the transparency of the comments to form comments to be played; the user terminal displaying the comments to be played in the comment playing area.

Preferably, in the video playing method, the step of the server increasing the transparency of the comments to form comments to be played includes:

the server obtaining the hue of the first region; the server calculating the target transparency of the comments according to a ratio threshold value and the hue, to form the comments to be played.

Preferably, in the video playing method, the step of the user terminal displaying the comments in the playing area outside the first region in the image of the original frame includes: the server obtaining the position of the first region in the image of the original frame; the server inverting the position of the first region to obtain the position of the comment playing area.

Preferably, in the video playing method, the step of the user terminal displaying the comments in the playing area outside the first region in the image of the original frame includes: the server dividing the original frame along the Y-axis; the server recognizing the Y-axis position of the first separated position; the server extracting the target position outside the Y axis position on the Y axis; the server defining the target position as the sliding Y axis of the comment playing area to determine the area of presenting comments; the user terminal displaying the comments in the comment playing area.

The present invention also discloses a server, in which is stored a computer program that is executed by a processor to carry out the steps introduced in the above-mentioned embodiments, therefore it won't be reiterated here additionally.

In addition, when a video playing system that is built base on a server and a user terminal is applied, the following steps can be performed according to the characteristics of the server and the user terminal:

the server obtaining a video and dividing the video into at least one original frame; the server identifying a graphical main structure in the original frame; the server identifying identifying and filling the outline of the graphical main structure with a color to form a first separated region; the user terminal displaying the comments in the comment playing area outside the first region in the image of the original frame.

Preferably, in the video playing system, the step of the server recognizing a graphical main structure in the original frame includes: the server recognizing the boundary pixels of any one of character, still object and animal in the original frame; the server extracting an image unit located in the boundary pixels as the graphical main structure.

Preferably, in the video playing system, the step of the server recognizing the boundary pixels of the character in the original frame and extracting an image unit located in the boundary pixels as the graphical main structure includes: the server recognizing the joint bending positions and the facial features of the character; the server connecting the adjacent joint bending positions to form a body structure; the server connecting the facial features to form a facial structure; the server splicing the body structure and the facial structure to form a limb structure.

Preferably, in the video playing system, the step of the server recognizing the facial features includes: the server recognizing the farthest points at both sides, the nose and the lowest point at the lower side of the face of the character; the step of the server connecting the facial features to form a facial structure includes: the server connecting the farthest points at both sides to form a face width; the server connecting the nose and the lowest point at the lower side, to make the line connecting the nose and the lowest point of the lower side and the reverse line with the same length as the line as a face length; the server splicing the face width and the face length to form the facial structure.

Preferably, in the video playing system, after the step of the server identifying and filling the outline of the graphical main structure to form a first separated region, the method further includes: the server recognizing a text area in the original frame; the server identifying and filling the outline of the text area to form a second separated region; the server displaying the comments in the playing area outside the second separated region in the image of the original frame.

Preferably, in the video playing system, the step of the server identifying and filling the outline of the text area to form a second separated region includes: the server framing the outside of the text area with a rectangular frame and making the rectangular frame as the second separated region.

Preferably, in the video playing system, the step of the server displaying the comments in the playing area outside the first region in the image of the original frame includes: the server obtaining the comments; the server increasing the transparency of the comments to form comments to be played; the user terminal displaying the comments to be played in the playing area.

Preferably, in the video playing system, the step of the server increasing the transparency of the comments to form comments to be played includes: the server obtaining the hue of the first region; the server calculating the target transparency of the comments according to a ratio threshold value and the hue, to form the comments to be played.

Preferably, in the video playing system, the step of the user terminal displaying the comments in the playing area outside the first region in the image of the original frame includes: the server obtaining the position of the first region in the image of the original frame; the server inverting the position of the first region to obtain the position of the playing area.

Preferably, in the video playing system, the step of the user terminal displaying the comments in the playing area outside the first region in the image of the original frame includes: the server dividing the original frame along the Y axis; the server recognizing the Y axis position of the first separated position; the server extracting the target position outside the Y axis position on the Y axis; the server defining the target position as the sliding Y axis of the playing area to determine the playing area; the user terminal displaying the comments in the playing area. It should be noted that the embodiments of the present invention have better practicality, and do not limit in any form on the present invention, any technician familiar with the field may make use of and change or modify the above-disclosed technical contents to equivalent effective embodiments, any modifications or equivalent changes made to the above embodiments according to the technical essence of the present invention, without departing from the content of the technical solutions of the present invention, are still within the scope of the technical solutions of the present invention.

It should be understood that although various information may be described in terms of first, second, third and so on in the present disclosure, such information should not be limited to these terms. These terms are used only to separate the same type of information from one another. For example, without departing from the scope of the present disclosure, the first information can also be referred to as the second information, and similarly, the second information can also be referred to as the first information. Depending on the context, for example, the word "if" used here can be interpreted as "at the time of" or "when" or "responding to determining".

In the description of the present invention, it needs to be understood that the orientation or position relationships indicated by terms "longitudinal", "lateral", "upper", "lower", "front", "back", "left", "right", "vertical", "horizontal", "top", "bottom", "outside", "inside", etc. are based on the orientation or position relationships shown in the attached drawings, it is only to facilitate and simplify the description of the present invention, and not to indicate or imply that the device or element referred to must have a specific orientation, be constructed and operated in a specific orientation, so it cannot be understood as a limitation to the present invention.

The terms used in the present disclosure are intended solely to describe specific embodiments, rather than to limit the present disclosure. The "A", "said" and "the" in the singular form used in the present disclosure and the appended claims are also intended to include the plural form, unless the context clearly indicates other meanings. It should also be understood that the term "and/or" used in the present text refers to any or all possible combinations of one or more related items listed. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems described above may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described above with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication.

Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A computer-implemented method of presenting comments relative to video frames, comprising:
    obtaining a video comprising a plurality of frames;
    detecting an edge of at least one object in a frame among the plurality of frames;
    identifying an area inside the edge of the at least one object as a first area and filling the first area with a color so as to distinguish the first area from others;
    determining a location of the first area relative to the frame; and
    determining a movement direction of at least one comment to be presented relative to the frame or a change of a transparency value of the at least one comment to be presented relative to the frame based at least on the location of the first area.

2. The computer-implemented method of claim 1, further comprising:
    dividing the frame into a plurality of units along a Y-axis based on a height of the at least one comment to be presented;
    determining a range of Y-coordinates within which the first area is located; and
    identifying an area of presenting the at least one comment based at least on the range of Y-coordinates, wherein the area of presenting the at least one comment is located outside the first area.

3. The computer-implemented method of claim 2, further comprising:
    determining a movement path of the at least one comment relative to the frame and presenting the at least one comment along an outer edge of the first area and within the area of presenting the at least one comment.

4. The computer-implemented method of claim 2, further comprising:
    identifying an area surrounding a text in the frame as a second area; and
    determining a location of the second area by coordinates of four corners of a box surrounding the text.

5. The computer-implemented method of claim 4, further comprising:
    determining a movement path of the at least one comment relative to the frame and presenting the at least one comment outside the second area and within the area of presenting the at least one comment.

6. The computer-implemented method of claim 1, further comprising:
    obtaining a hue value of the at least one object in the frame; and determining an increase of the transparency value of the at least one comment based at least on the hue value of the at least one object.

7. The computer-implemented method of claim 1, wherein the at least one object in the frame is a human being.

8. The computer-implemented method of claim 7, further comprising:
 identifying a plurality of positions of bending joints of the human being and a plurality of facial features of the human being;
 connecting the plurality of positions of bending joints to form a body structure;
 generating a facial structure based on the plurality of facial features; and
 stitching the body structure and the facial structure to define the first area.

9. The computer-implemented method of claim 8, wherein the identifying the plurality of facial features further comprises identifying a left-side farthest point, a right-side farthest point, a point indicative of a nose, and a lowest point of a face of the human being.

10. The computer-implemented method of claim 9, wherein the generating a facial structure based on the plurality of facial features further comprises:
 connecting the left-side farthest point and the right-side farther point to define a width of the face;
 connecting the point indicative of the nose and the lowest point of the face and extending in an opposite direction a same length of a line connecting the point indicative of the nose and the lowest point so as to define a length of the face; and
 generating the facial structure based on a defined width of the face and a defined length of the face.

11. A computing system of presenting comments relative to video frames, comprising:
 at least a processor; and
 at least a memory communicatively coupled to the at least a processor to configure the at least a processor to:
 obtain a video comprising a plurality of frames;
 detect an edge of at least one object in a frame among the plurality of frames;
 identify an area inside the edge of the at least one object as a first area and filling the first area with a color so as to distinguish the first area from others;
 determine a location of the first area relative to the frame; and
 determine a movement direction of at least one comment to be presented relative to the frame or a change of a transparency value of the at least one comment to be presented relative to the frame based at least on the location of the first area.

12. The computing system of claim 11, the at least a memory further configuring the at least a processor to:
 divide the frame into a plurality of units along a Y-axis based on a height of the at least one comment to be presented;
 determine a range of Y-coordinates within which the first area is located; and
 identify an area of presenting the at least one comment based at least on the range of Y-coordinates, wherein the area of presenting the at least one comment is located outside the first area.

13. The computing system of claim 12, the at least a memory further configuring the at least a processor to:
 determine a movement path of the at least one comment relative to the frame and present the at least one comment along an outer edge of the first area and within the area of presenting the at least one comment.

14. The computing system of claim 12, the at least a memory further configuring the at least a processor to:
 identify an area surrounding a text in the frame as a second area; and
 determine a location of the second area by coordinates of four corners of a box surrounding the text.

15. The computer-implemented method of claim 14, the at least a memory further configuring the at least a processor to:
 determine a movement path of the at least one comment relative to the frame and present the at least one comment outside the second area and within the area of presenting the at least one comment.

16. The computing system of claim 11, the at least a memory further configuring the at least a processor to:
 obtain a hue value of the at least one object in the frame; and
 determine an increase of the transparency value of the at least one comment based at least on the hue value of the at least one object.

17. A non-transitory computer-readable storage medium bearing computer-readable instructions that upon execution on a computing device cause the computing device at least to:
 obtain a video comprising a plurality of frames;
 detect an edge of at least one object in a frame among the plurality of frames;
 identify an area inside the edge of the at least one object as a first area and filling the first area with a color so as to distinguish the first area from others;
 determine a location of the first area relative to the frame; and
 determine a movement direction of at least one comment to be presented relative to the frame or a change of a transparency value of the at least one comment to be presented relative to the frame based at least on the location of the first area.

18. The non-transitory computer-readable storage medium of claim 17, further comprising computer-readable instructions that upon execution on the computing device cause the computing device at least to:
 divide the frame into a plurality of units along a Y-axis based on a height of the at least one comment to be presented;
 determine a range of Y-coordinates within which the first area is located; and
 identify an area of presenting the at least one comment based at least on the range of Y-coordinates, wherein the area of presenting the at least one comment is located outside the first area.

19. The non-transitory computer-readable storage medium of claim 18, further comprising computer-readable instructions that upon execution on the computing device cause the computing device at least to:
 identify an area surrounding a text in the frame as a second area;
 determine a location of the second area by coordinates of four corners of a box surrounding the text; and
 determine a movement path of the at least one comment relative to the frame and present the at least one comment outside the second area and within the area of presenting the at least one comment.

20. The non-transitory computer-readable storage medium of claim 17, further comprising computer-readable instructions that upon execution on the computing device cause the computing device at least to:
    obtain a hue value of the at least one object in the frame; and
    determine an increase of the transparency value of the at least one comment based at least on the hue value of the at least one object.

\* \* \* \* \*